(12) United States Patent
Shimokawa (10) Patent No.: US 11,068,710 B2
(45) Date of Patent: Jul. 20, 2021

(54) INFORMATION PROCESSING APPARATUS, INFORMATION PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventor: Noriyuki Shimokawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 98 days.

(21) Appl. No.: 16/354,232

(22) Filed: Mar. 15, 2019

(65) Prior Publication Data

US 2019/0311195 A1  Oct. 10, 2019

(30) Foreign Application Priority Data

Apr. 5, 2018   (JP) .............................. JP2018-072868

(51) Int. Cl.
| | |
|---|---|
| *G06K 9/46* | (2006.01) |
| *G06K 9/66* | (2006.01) |
| *G06K 9/00* | (2006.01) |
| *G06Q 40/00* | (2012.01) |

(52) U.S. Cl.
CPC ..... *G06K 9/00469* (2013.01); *G06K 9/00161* (2013.01); *G06Q 40/123* (2013.12); *G06K 2209/01* (2013.01)

(58) Field of Classification Search
CPC ........... G06K 9/00469; G06K 9/00161; G06Q 40/123

USPC ......................................................... 382/195
See application file for complete search history.

(56) References Cited

U.S. PATENT DOCUMENTS

| | | | |
|---|---|---|---|
| 2007/0168430 A1* | 7/2007 | Brun ................... | G06Q 10/107 709/206 |
| 2017/0205965 A1* | 7/2017 | Goel ................... | G06Q 10/103 |

FOREIGN PATENT DOCUMENTS

| | | |
|---|---|---|
| JP | 2008048132 | 2/2008 |
| JP | 2012008992 | 1/2012 |

\* cited by examiner

*Primary Examiner* — Stephen P Coleman
(74) *Attorney, Agent, or Firm* — JCIPRNET (57) ABSTRACT

An information processing apparatus includes a first acquisition section that acquires an image of a digitized document, a second acquisition section that acquires date information from the image acquired by the first acquisition section, a third acquisition section that acquires an application period different from an application period in a case where a recipient receiving the document is the same as an operator who has performed an operation of digitizing the document, in a case where the recipient is different from the operator, and a processing section that performs processing of preserving the image in a case where a current date and time satisfies a preset criterion for an application deadline set based on the date information acquired by the second acquisition section and the application period acquired by the third acquisition section.

20 Claims, 12 Drawing Sheets

APPLICATION PERIOD MANAGEMENT TABLE

| OPERATOR | APPLICATION PERIOD |
|---|---|
| RECIPIENT | 3 DAYS |
| AGENT OF RECIPIENT | 1 MONTH AND 7 DAYS |

ERROR NOTIFICATION 2

FIG. 12

INFORMATION PROCESSING APPARATUS, INFORMATION PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-072868 filed Apr. 5, 2018.

BACKGROUND

(i) Technical Field

The present invention relates to an information processing apparatus, an information processing system, and a non-transitory computer readable medium storing a program.

(ii) Related Art

JP2008-048132A discloses an image processing apparatus as follows. In a case where the image processing apparatus reads an original document, performs signature processing and time-stamp processing on an electronic document obtained by the reading, so as to obtain a digitized official document, and preserves the digitized official document, in a case where the electronic document obtained by the reading matches with a specific format and satisfies a predetermined condition, the image processing apparatus does not recognize the electronic document as official document even in a case of being digitized and preserved. Thus, the image processing apparatus does not perform the signature processing and the like on such a document.

JP2012-008992A discloses a travel expense/cost settlement system as follows. In a case where settlement processing of a travel expense, cost, or the like is performed, error checking of whether or not information regarding a transaction date, a transaction destination, amount of money for the transaction destination, and the like which have been input by a user on a settlement input screen satisfies the requirements for the electronic book preservation law is performed. Then, an electronic signature and a time stamp are automatically added to the national tax-related document such as the attached receipt or invoice.

SUMMARY

Aspects of non-limiting embodiments of the present disclosure relate to an information processing apparatus, an information processing system, and a non-transitory computer readable medium storing a program in which performing processing for preserving an invalid document image can be prevented even in a case where an operator who has performed an operation of digitizing a document changes an application deadline in a case where the document is digitized and preserved.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus which includes a first acquisition section that acquires an image of a digitized document, a second acquisition section that acquires date information from the image acquired by the first acquisition section, a third acquisition section that acquires an application period different from an application period in a case where a recipient receiving the document is the same as an operator who has performed an operation of digitizing the document, in a case where the recipient is different from the operator, and a processing section that performs processing of preserving the image in a case where a current date and time satisfies a preset criterion for an application deadline set based on the date information acquired by the second acquisition section and the application period acquired by the third acquisition section.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the drawings.

Figure 1:
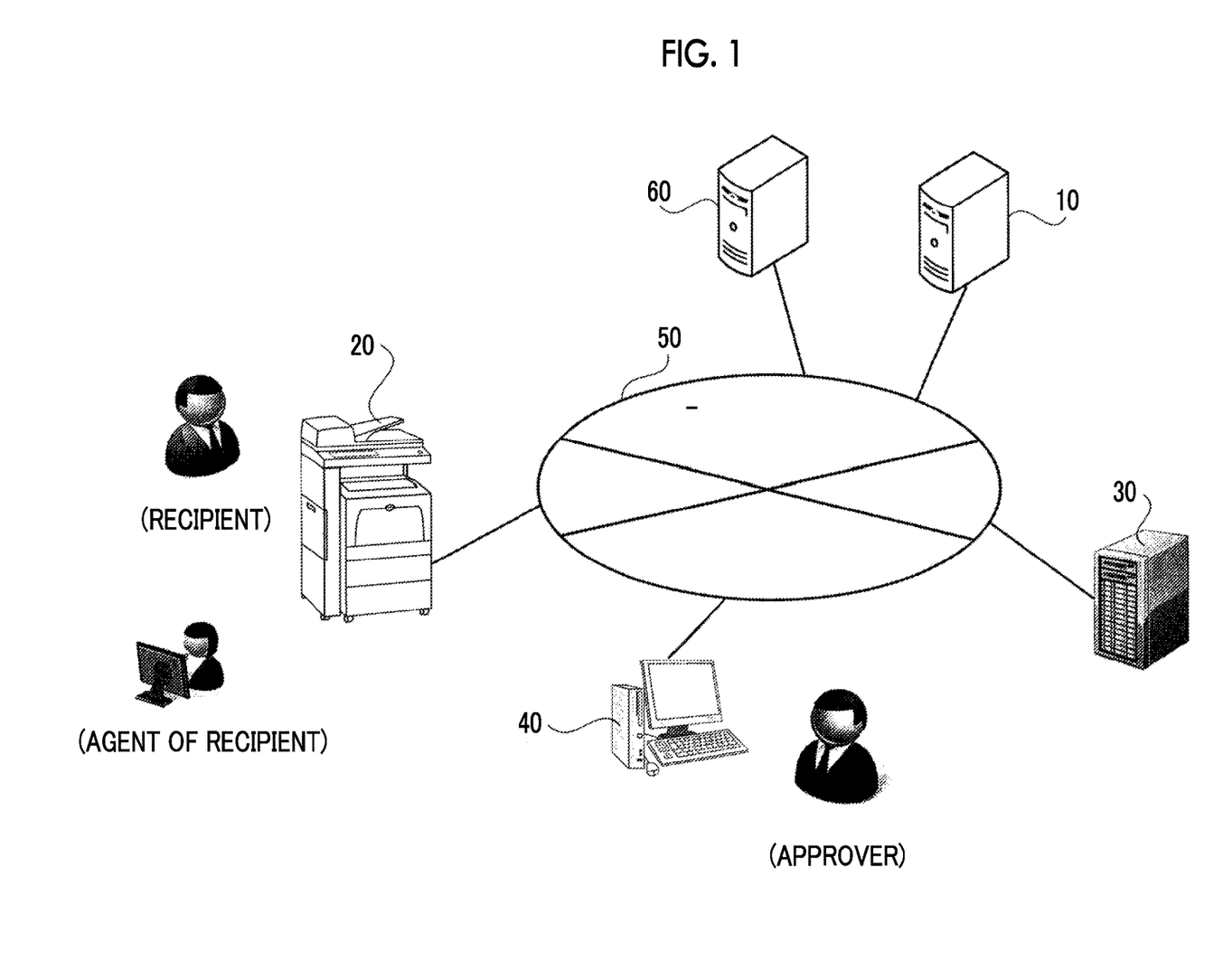
FIG. 1 is a diagram illustrating a system configuration of an information processing system according to an exemplary embodiment of the present invention.

FIG. 1 is a diagram illustrating a system configuration of an information processing system according to an exemplary embodiment of the present invention.

As illustrated in FIG. 1, the information processing system in the exemplary embodiment of the present invention includes a relay server 10, an image forming apparatus 20, a preservation server 30, a terminal device 40, an optical character reading (OCR) server 60 which are connected to each other by a network 50.

The information processing system in the exemplary embodiment is a system that digitizes and preserves national tax-related documents such as receipts. Here, the national tax-related documents mean various documents on which conservation obligation is imposed in the tax law such as the corporate tax law, the income tax law, and the excise tax law.

In the electronic book preservation law, in a case where the national tax-related document such as a receipt is digitized and preserved, preservation in a state of adding a time stamp to the document is required. The time stamp includes a hash value of an image of the digitized national tax-related document and preservation date information. Thus, it is possible to certify that the image of the national tax-related document has not been tampered and to certify the date and time in which the document has been preserved, by checking details of the time stamp later.

In a case where such an image of the national tax-related document is registered, an application deadline in the electronic book preservation law is determined. For example, in a case where a receipt is digitized and preserved, it is required that a time stamp is added to the receipt and the receipt is preserved within a period determined by the law from the issue date (=reception date) of the receipt.

The application deadline varies depending on whether an operator who performs an operation of digitizing a document so as to apply for preserving a document image is a recipient or an agent of the recipient. For example, in a case where the operator is a recipient, the application period is 3 days from the reception date. In a case where the operator is an agent of a recipient, the application period is one month and 7 days from the reception date. In this manner, the application period is determined to vary.

In the electronic book preservation law, in a case where a recipient performs an operation of digitization so as to preserve a receipt image, it is required that the recipient signs the autograph on the receipt. That is, in a case where the recipient himself/herself applies for preservation, the receipt image includes autograph information.

In the following exemplary embodiment, a case where a time stamp is added to a receipt image obtained by digitizing a receipt among national tax-related documents and the receipt image having a time stamp added thereto is preserved will be described. However, the present invention can also be similarly applied to a case of digitizing and preserving a national tax-related document other than the receipt. The present invention can also be similarly applied to a case where an image of a document other than the national tax-related document is preserved.

An image forming apparatus 20 is an apparatus called as a multifunction device having plural functions such as a printing function, a scanning function, a copying function, a facsimile function, which have been set in, for example, an office of a user. In the exemplary embodiment, the image forming apparatus 20 functions as an image reading apparatus that converts various documents such as receipts into images by digitization.

The preservation server 30 is an information processing apparatus that adds a time stamp to a document image of a digitized receipt or the like and preserves the document image having a time stamp added thereto. In the exemplary embodiment, a case where both kinds of processing of adding a time stamp to a document image and processing of preserving the document image having a time stamp added thereto are performed in the preservation server 30 will be described. However, the kinds of processing may be performed by different servers, respectively.

In a case where a service of adding a time stamp to a receipt image and preserving the receipt image having a time stamp added thereto in the preservation server 30 is charged, the fee is charged each time a time stamp is added, and the cost is charged.

The terminal device 40 is a device such as a personal computer, which is operated by an approver who does an approval work of a document image preserved in the preservation server 30.

The relay server 10 is an information processing apparatus that receives a preservation application of a receipt image obtained by scanning in the image forming apparatus 20, checks whether or not the preservation application is performed within a legal application deadline determined by the electronic book preservation law, and then performs a preservation processing request of a receipt image to the preservation server 30.

The OCR server 60 extracts date information, recipient name information, or autograph information from a document image of a digitized receipt or the like. The OCR server 60 receives a document image such as a receipt image which is a target of OCR processing, from the relay server 10. The OCR server performs the OCR processing on the receipt image which has been acquired from the image forming apparatus 20 by the relay server 10, so as to extract date information of the issue date and the like from the receipt image.

In the exemplary embodiment, descriptions will be made by using a case where a recipient or an agent of the recipient operates the image forming apparatus 20 to apply for preserving a receipt image obtained by digitization in a manner of scanning. However, the recipient or an agent of the recipient may capture an image of a receipt by using a portable terminal device such as a smart phone and apply for preserving a picture image of the receipt, which has been acquired by the capturing.

Figure 2:
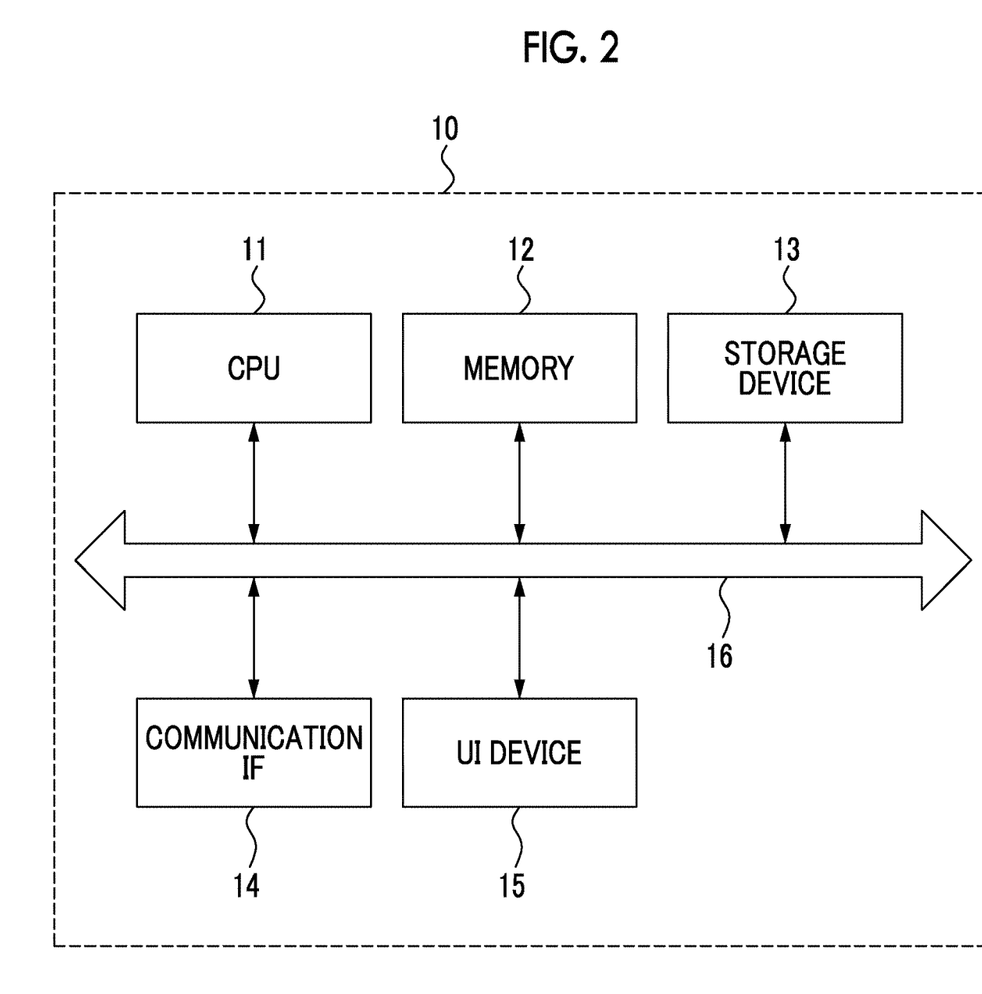
FIG. 2 is a block diagram illustrating a hardware configuration of a relay server 10 in the exemplary embodiment of the present invention.

FIG. 2 illustrates a hardware configuration of the relay server 10 in the information processing system in the exemplary embodiment.

As illustrated in FIG. 2, the relay server 10 includes a CPU 11, a memory 12, a storage device 13 such as a hard disk drive (HDD), a communication interface (IF) 14, and a user interface (UI) device 15. The communication IF 14 transmits and receives data to and from an external device and the like via the network 50. The UI device 15 includes a touch panel or a keyboard with a liquid crystal display. The components are connected to each other via a control bus 16.

The CPU 11 performs predetermined processing based on a control program stored in the memory 12 or the storage device 13 so as to control an operation of the relay server 10. In the exemplary embodiment, descriptions will be made on the assumption that the CPU 11 reads and executes the control program stored in the memory 12 or the storage device 13. However, the program may be stored in a storage medium such as a CD-ROM and may be provided to the CPU 11.

Figure 3:
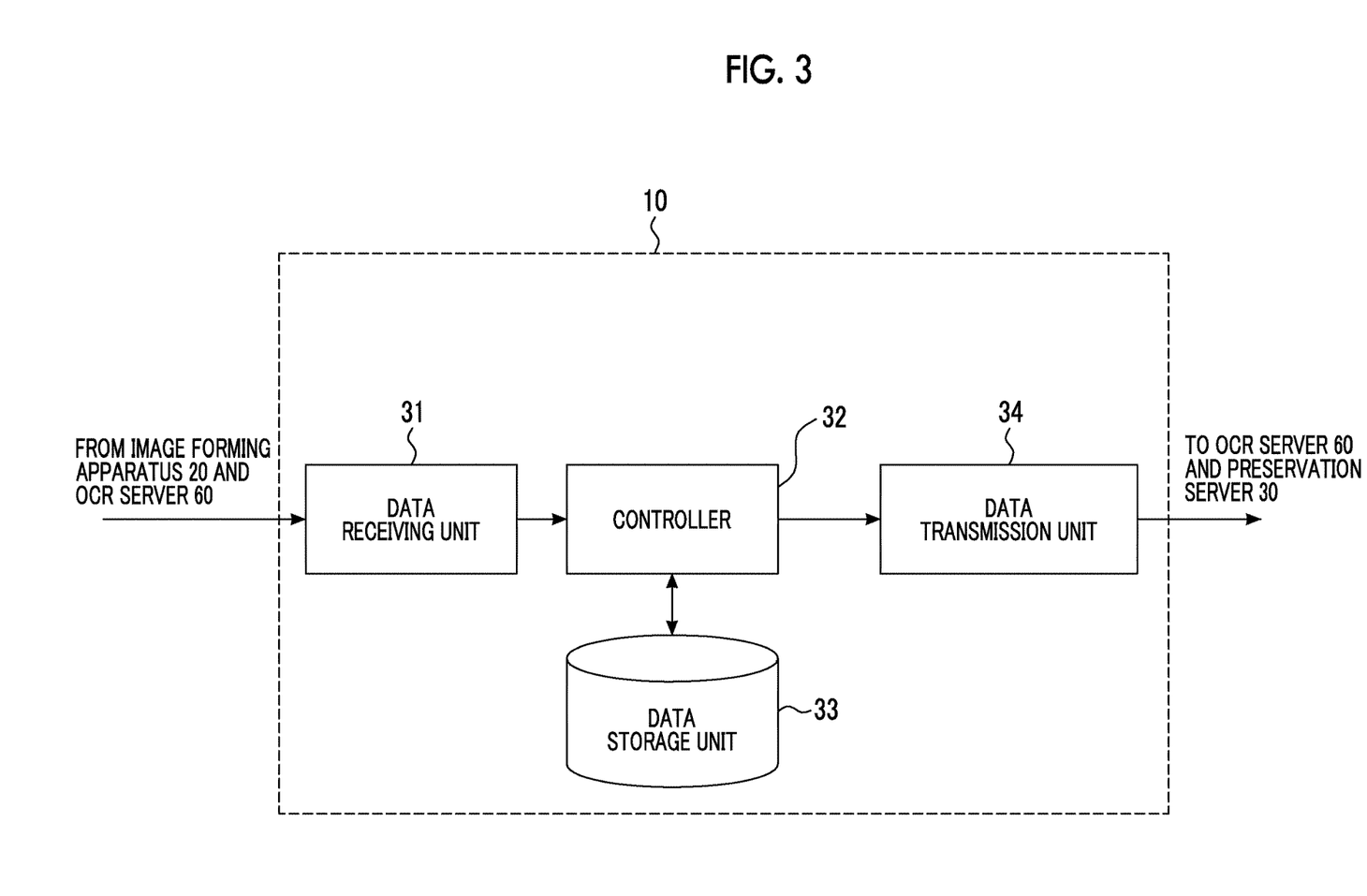
FIG. 3 is a block diagram illustrating a functional configuration of the relay server 10 in the exemplary embodiment of the present invention.

FIG. 3 is a block diagram illustrating a functional configuration of the relay server 10, which is realized by executing the control program.

As illustrated in FIG. 3, the relay server 10 in the exemplary embodiment includes a data receiving unit 31, a controller 32, a data storage unit 33, and a data transmission unit 34.

The data receiving unit 31 acquires a digitized receipt image from the image forming apparatus 20. The data receiving unit 31 receives various kinds of information such as date information, recipient name information, and autograph information, which have been extracted from a receipt image, from the OCR server 60 which has received the receipt image and has performed the request of OCR processing on the receipt image.

The data storage unit 33 stores information of an application period of, for example, 3 days in a case where a recipient of a receipt is the same as an operator who has performed an operation of digitizing the receipt, and stores an application period of, for example, one month and 7 days in a case where the recipient is different from the operator.

Figure 4:
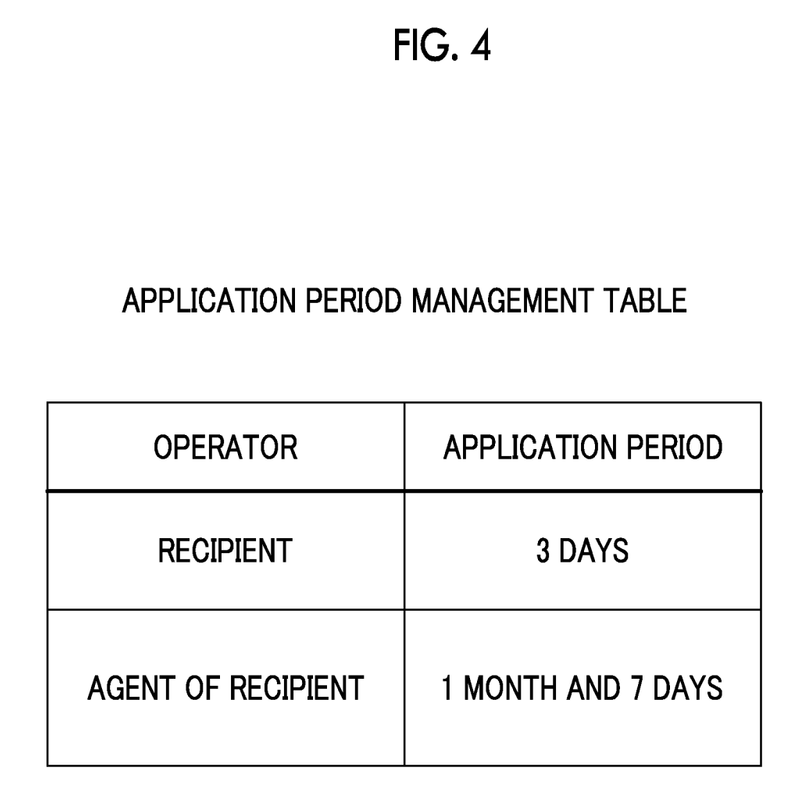
FIG. 4 is a diagram illustrating an example of an application period management table stored in a data storage unit 33.

That is, as illustrated in FIG. 4, the data storage unit 33 stores an application period management table in which different values are respectively set for the application deadline in a case where an operator is a recipient of a receipt and a case where the operator is an agent other than the recipient. Here, the upper limit of the application period is determined by the law. However, different application periods may be respectively determined for contract users of each company or the like within the legal upper limit, and the application period management table for each user may be stored.

In a case where the data receiving unit 31 acquires a receipt image from the image forming apparatus 20, the controller 32 acquires an application period different from an application period in a case where a recipient receiving a receipt is the same as an operator who has performed an operation of digitizing the receipt, in a case where the recipient is different from the operator. The controller acquires the application period with reference to the application period management table stored in the data storage unit 33.

That is, the controller 32 acquires information of 3 days as the application period in a case where the operator is a recipient. The controller 32 acquires information of one month and 7 days as the application period in a case where the operator is a person except for the recipient, that is, an agent of the recipient.

That is, in a case where the recipient is different from the operator, the controller 32 acquires the application period (one month and 7 days) longer than the application period (3 days) in a case where the recipient is the same as the operator. In a case where the recipient is the same as the operator, the controller 32 acquires the application period (3 days) shorter than the application period (one month and 7 days) in a case where the recipient is different from the operator.

The controller 32 controls the data transmission unit 34 to transmit a receipt image from the image forming apparatus 20 to the OCR server 60, and acquires date information such as the issue date, recipient name information, or autograph information from the receipt image.

In a case where the recipient receiving the receipt is the same as the operator who has performed an operation of digitizing the receipt, the controller 32 performs processing of checking whether or not autograph information is provided in the acquired receipt image.

As described above, the OCR server 60 performs OCR processing on the receipt image transmitted from the relay server 10 so as to extract date information, recipient name information, or autograph information.

The controller 32 acquires date information extracted by the OCR server 60 and calculates an application deadline based on the acquired date information and the application period acquired from the data storage unit 33. That is, the application deadline is set based on the date of a receipt (issue date: reception date) and the application period.

Specifically, the controller 32 specifies a recipient by the recipient name information extracted from the receipt image in the OCR server 60. In a case where the specified recipient is different from the operator, the controller 32 acquires an application period different from an application period of 3 days in a case where the recipient is the same as the operator, that is, acquires the application period of one month and 7 days. For example, in a case where the recipient is the same as the operator, the controller 32 acquires information of 3 days as the application period. In a case where the reception date of the receipt is April 3, April 6 is set as the application deadline date.

In the exemplary embodiment, descriptions will be made on the assumption that the controller 32 performs processing of acquiring the application period and calculating the application deadline. However, the controller 32 may acquire information of the application deadline calculated in the outside of the relay server 10.

The destination of a receipt is not limited to a recipient and may be the name of a corporation to which the recipient belongs. Even in such a case, in a case where the recipient performs preservation of a receipt image as an operator, it is required that an autograph (signature in the handwriting) of the recipient is described on the surface of the receipt. Therefore, the controller 32 may specify the recipient by autograph information extracted from the receipt image in the OCR server 60.

Further, in a case where the autograph described in the receipt image is broken characters like the signature, it may be difficult to specify the recipient even though character recognition processing is performed. Even in such a case, a signature image of a user who may be a recipient may be previously stored in the data storage unit 33 in association with the user name. A user associated with a signature image which coincides with a signature image included in a receipt image may be specified as a recipient of the receipt.

In a case where the current date and time satisfies a preset criterion for the calculated application deadline, the controller 32 performs processing of adding a time stamp to the receipt image and preserving the receipt image, that is, processing of transmitting the receipt image to the preservation server 30.

Specifically, in a case where the calculated application deadline is later than the current date and time, the controller 32 transmits the receipt image to the preservation server 30. The controller 32 may set various criteria between the calculated application deadline and the current date and time. For example, the controller 32 does not transmit the receipt image to the preservation server 30 in every case where the current date and time is before the application deadline, but transmits the receipt image to the preservation server 30 in a case where the current date and time is before one day or more from the application deadline or in a case where the current date and time is before two days or more from the application deadline.

The data transmission unit 34 transmits the receipt image received from the image forming apparatus 20 to the OCR server 60 or transmits the receipt image to which a time stamp is added and which is preserved, to the preservation server 30, based on a control of the controller 32.

In a case where the current date and time does not satisfy the preset criterion for the application deadline set based on date information of the acquired receipt image and the acquired application period, the controller 32 notifies the operator who has applied for preserving the receipt image, of a message indicating that performing processing of preserving the receipt image is not possible. For example, the controller 32 directly transmits an electronic mail to the operator so as to notify the operator of a message indicating that performing the preservation application of the receipt image is not possible.

As the application period stored in the data storage unit 33, another application period different from the application period (3 days) in a case where the operator is the same as the recipient and the application period (one month and 7 days) in a case where the operator is different from the recipient, as illustrated in FIG. 4, may be stored.

For example, an application period of 20 days may be stored in the data storage unit 33, as an application period in a company policy in a case where the operator is different from the recipient.

In such a case, the controller 32 notifies the operator of a message indicating that the current date and time does not have passed an application deadline based on the application period of one month and 7 days, and but has passed an application deadline based on the application period of 20 days, in this case. That is, in a case where the current date and time does not have passed the legal application deadline, but has passed the application deadline based on the company policy, the controller may warn the operator to urge the operator to make an application with a more margin next time.

Further, the controller 32 causes the OCR server 60 to extract issuer information from the receipt image. The controller acquires the issuer information extracted by the OCR server 60. In a case where an issuer of a document, which is specified by the acquired issuer information, is included in preset list information, the controller may notify the operator of a message indicating that the specified issuer is included in the list information. For example, the controller generates a blacklist in which company names which are not to be used are described. Ina case where the issuer of the receipt is described in the blacklist, the controller warns the operator to notify the operator of a message indicating that the receipt image is not preserved.

Next, an operation of the information processing system in the exemplary embodiment will be described in detail with reference to the drawings.

Firstly, a flow of processing of the information processing system in the exemplary embodiment will be described with reference to the processing flow chart in FIG. 5.

Figure 6:
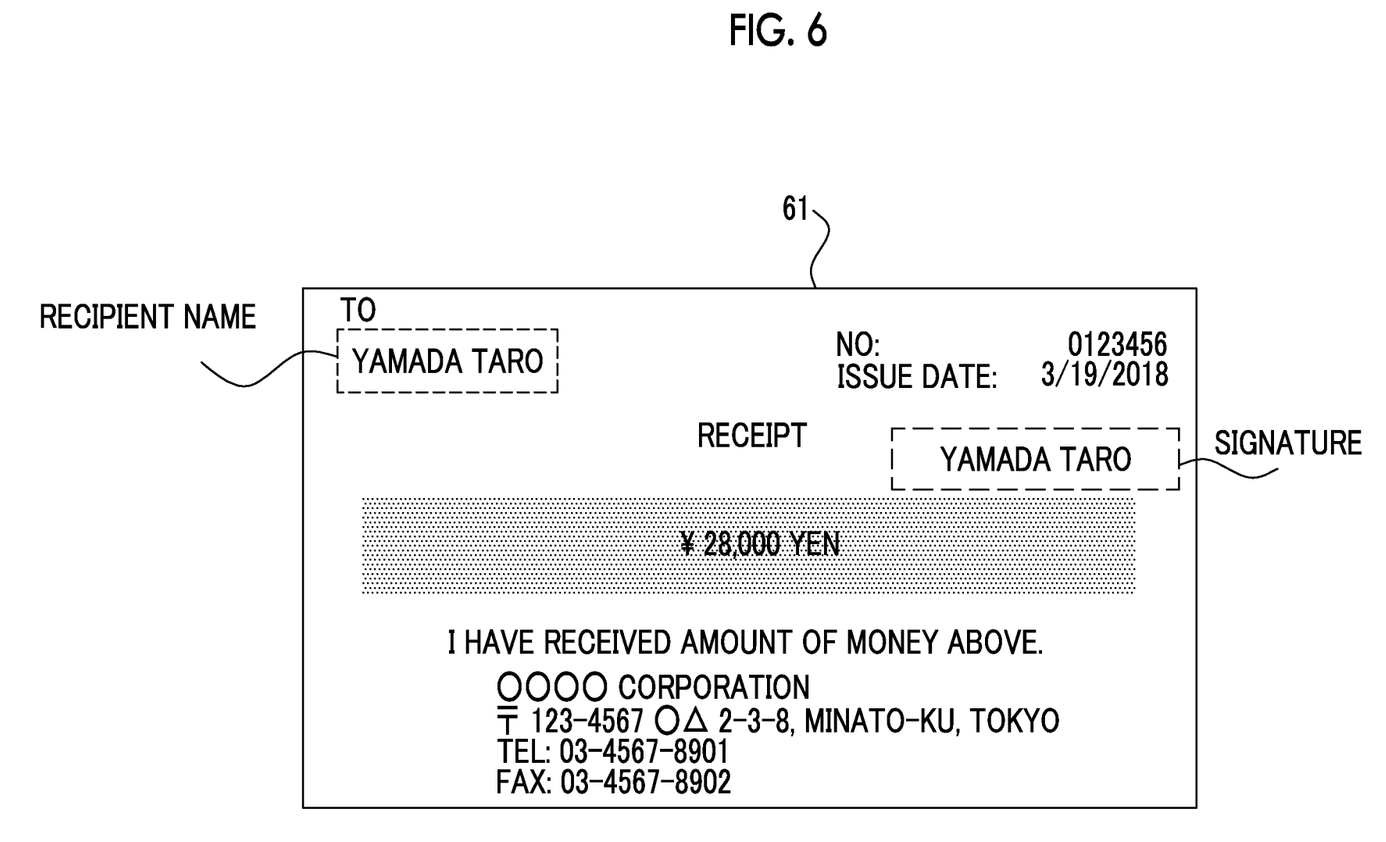
FIG. 6 is a diagram illustrating a receipt 61 as an example of a preservation target preserved in a state of adding a time stamp to the preservation target.
Figure 7:
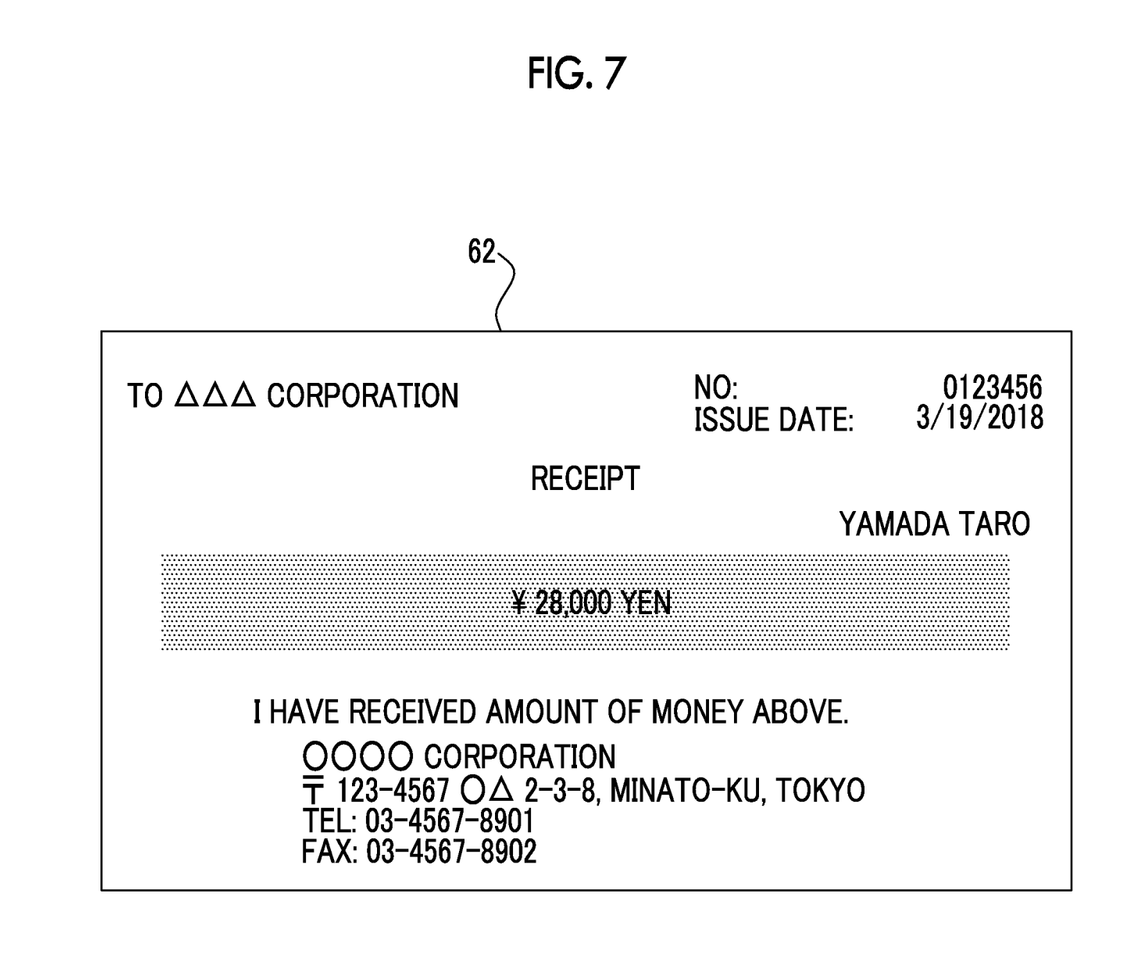
FIG. 7 is a diagram illustrating a receipt 62 as another example of the preservation target preserved in a state of adding the time stamp to the preservation target.

In the following descriptions, descriptions will be made by using receipts 61 and 62 as illustrated in FIGS. 6 and 7, as receipts which are preservation targets to which a time stamp is added, and which are preserved.

In the example of the receipt 61 illustrated in FIG. 6, a case where the recipient name is a personal name and the autograph is described will be described. In the example of the receipt 62 illustrated in FIG. 7, a case where the recipient name is a company name, and the autograph is described will be described.

Figure 5:
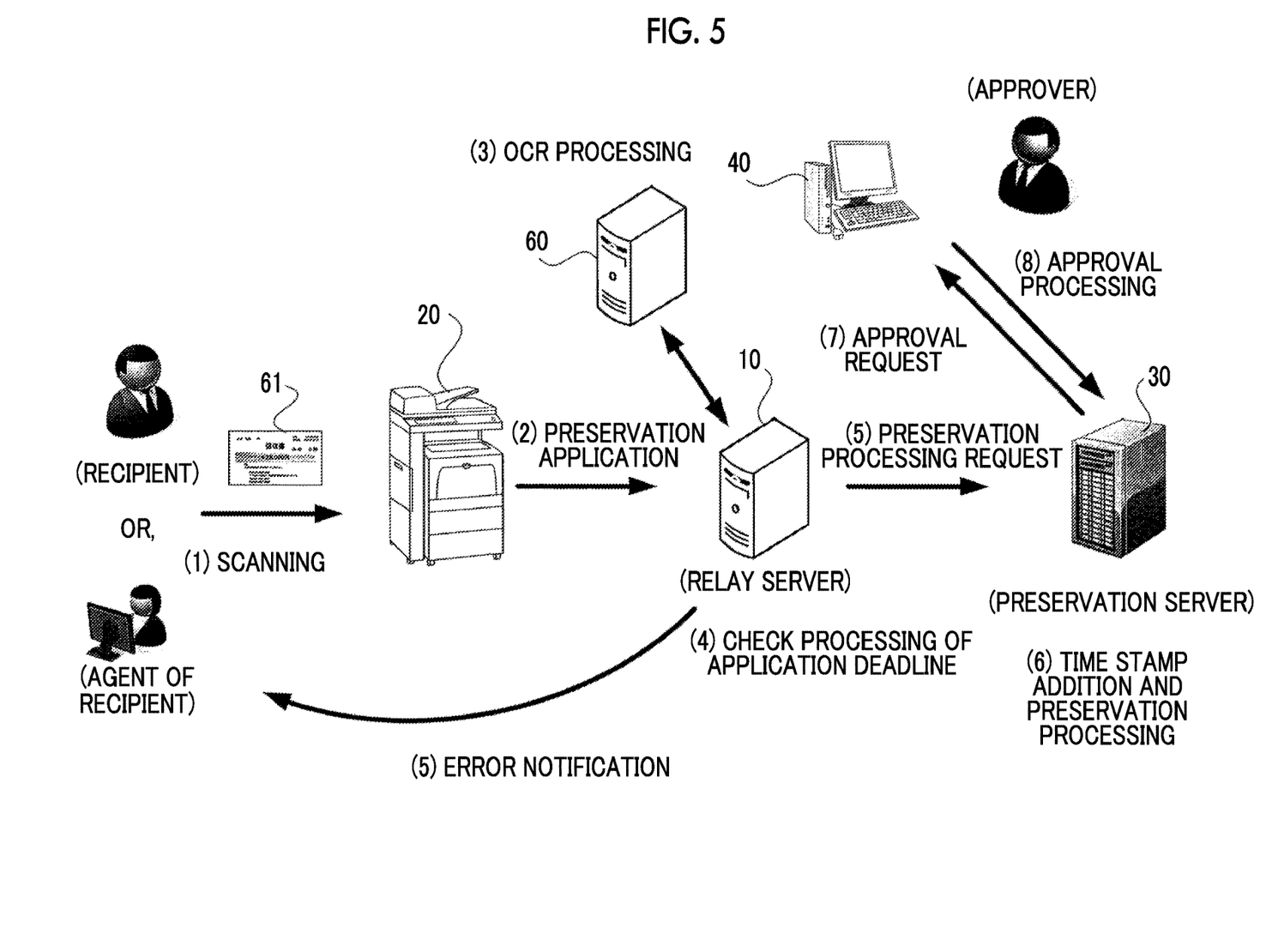
FIG. 5 is a processing flow chart illustrating a flow of processing of the information processing system in the exemplary embodiment of the present invention.

In FIG. 5, descriptions will be made by using a case where a recipient attempts to digitize the receipt 61 illustrated in FIG. 6 in the image forming apparatus 20 and to preserve the digitized receipt.

(1) Firstly, the receipt 61 is digitized by being scanned in the image forming apparatus 20.

(2) In a case where the receipt is digitized, the digitized receipt image is transmitted from the image forming apparatus 20 to the relay server 10, and a preservation application is performed.

(3) Then, the relay server 10 transmits the receipt image transmitted from the image forming apparatus 20, to the OCR server 60, and thus the OCR server 60 performs OCR processing of the receipt image.

(4) Then, the relay server 10 performs check processing of the application deadline by using date information, recipient name information, autograph information, and the like of the receipt, which have been extracted by the OCR server 60 through the OCR processing, and by using information of an application period in accordance with the recipient name of the receipt, which has been acquired from the data storage unit 33.

(5) Here, in a case where the preservation application of the receipt image is not performed within the application deadline, the relay server 10 notifies the operator who has performed the preservation application of the receipt image, of an occurrence of an error.

(5) Alternatively, in a case where the preservation application of the receipt image is performed within the application deadline, the relay server 10 performs a preservation processing request to the preservation server 30 so as to add a time stamp to the receipt image and to preserve the receipt image.

(6) In a case where the relay server performs the preservation processing request, the preservation server 30 performs processing of adding a time stamp to the receipt image from the relay server 10 and preserving the receipt image.

(7) Further, the preservation server 30 performs an approval request to the terminal device 40 of the approver by the receipt image being preserved.

(8) The approver performs approval processing via the terminal device 40, and thus the processing of preserving the receipt image is completed.

Figure 8:
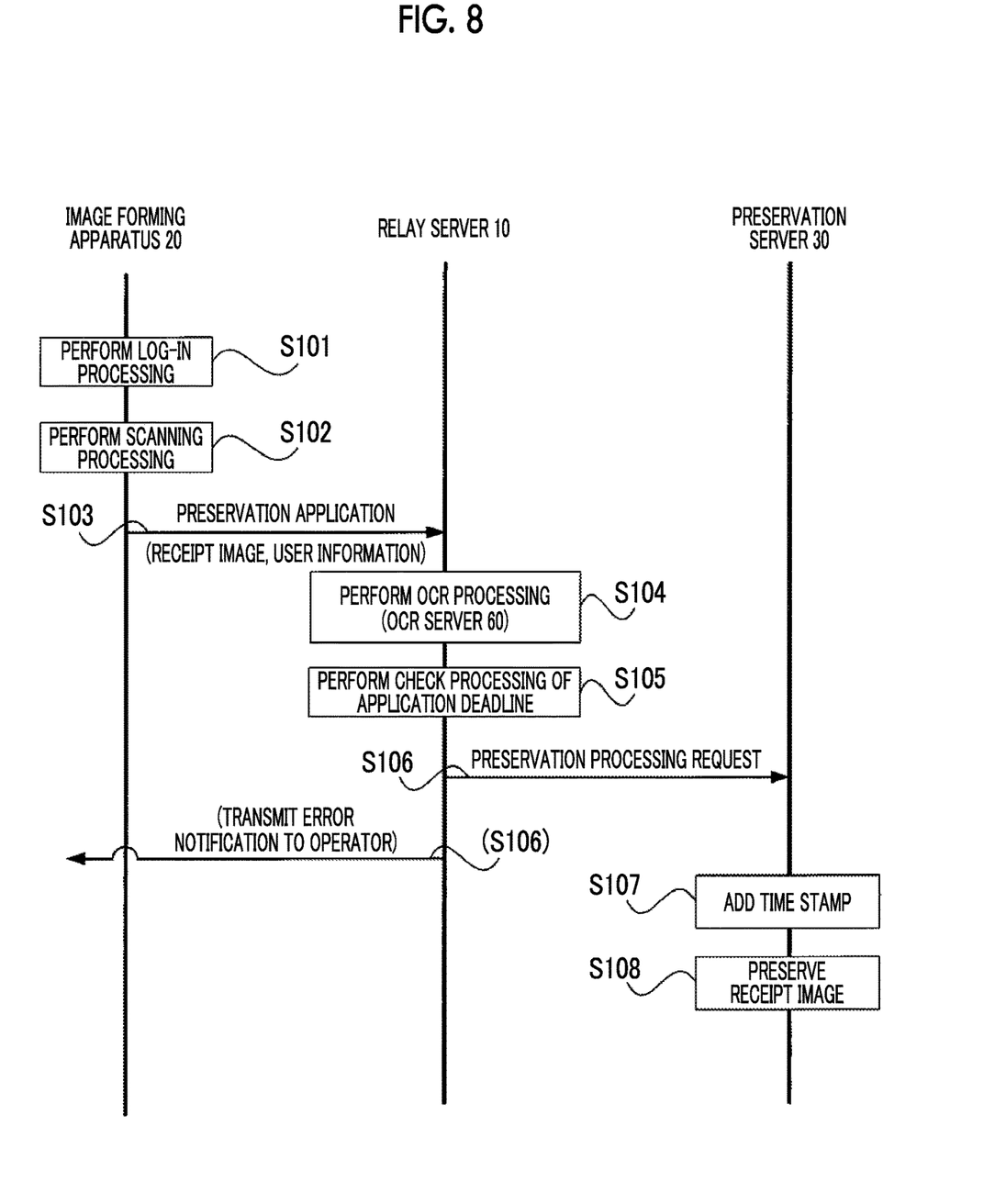
FIG. 8 is a sequence chart illustrating an operation of the information processing system in the exemplary embodiment of the present invention.

Next, an operation of the information processing system in the exemplary embodiment will be described in detail with reference to the sequence chart in FIG. 8.

Firstly, before scanning processing of a receipt is performed, log-in processing is performed by the operator in the image forming apparatus 20 (Step S101). User information such as a user ID of the operator who performs an operation is specified by the log-in processing.

After the log-in processing, the receipt is converted into a digitized receipt image by being scanned in the image forming apparatus 20 (Step S102).

In a case where the receipt is converted into the receipt image, the receipt image and the user information are transmitted from the image forming apparatus 20 to the relay server 10 (Step S103).

Then, the relay server 10 transmits the receipt image to the OCR server 60 so as to cause the OCR server to perform OCR processing, and then acquires various kinds of information such as recipient name information and date information, which have been extracted from the receipt image (Step S104).

The relay server 10 performs check processing of the application deadline, that is, whether or not the preservation application of the receipt image is performed within the application deadline, by using the user information received from the image forming apparatus 20, the date information and the recipient name information acquired from the OCR server 60, the application period management table stored in the data storage unit 33, and the like (Step S105).

Figure 9:
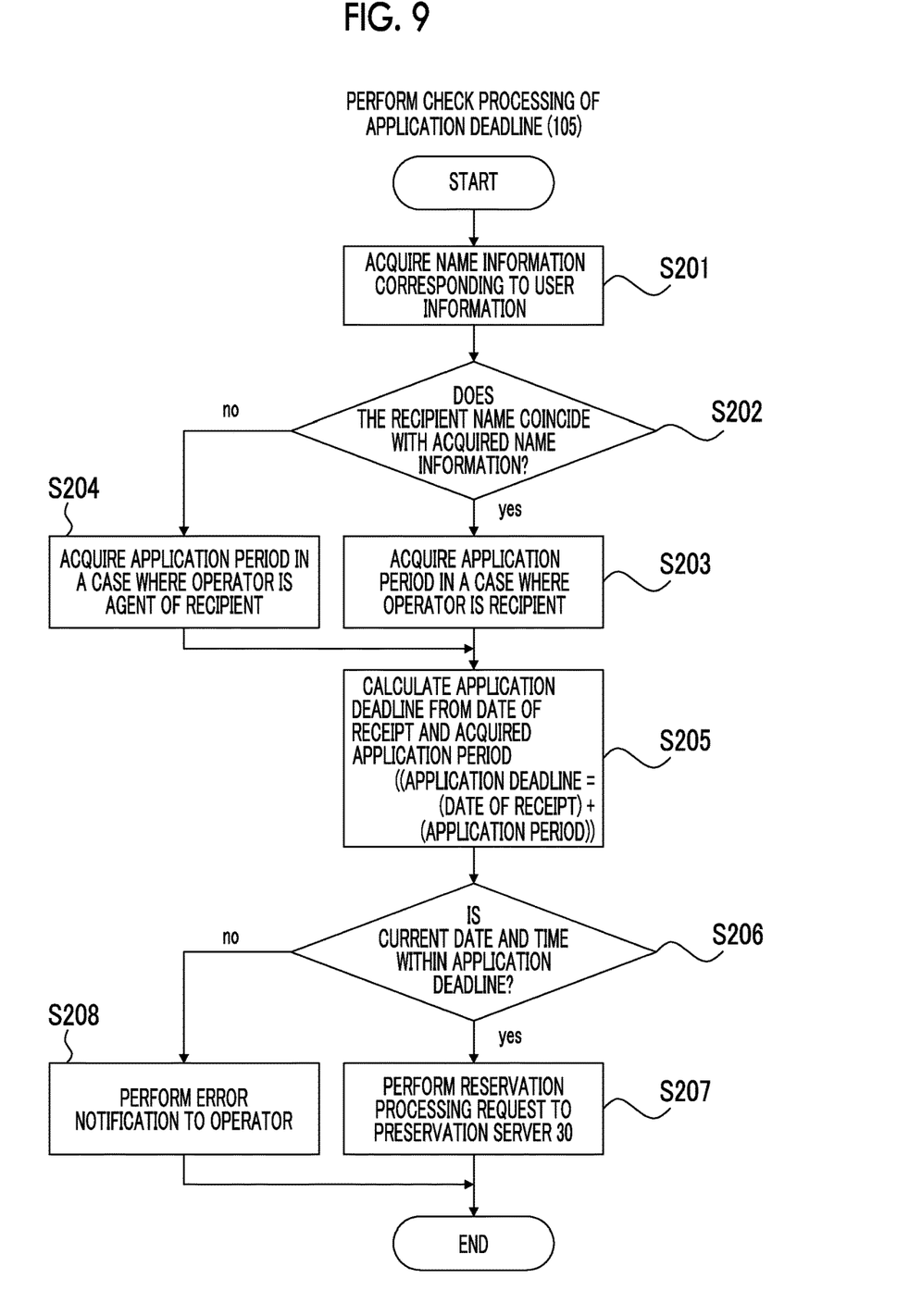
FIG. 9 is a flowchart illustrating details of check processing of an application deadline indicated in Step S105 in FIG. 8.

Details of the check processing (Step S105) of the application deadline will be described with reference to the flowchart in FIG. 9.

Firstly, the relay server 10 acquires name information such as a user name, which corresponds to the user information transmitted from the image forming apparatus 20 (Step S201).

The relay server 10 determines whether or not the recipient name information of the receipt, which has been extracted by the OCR processing coincides with the acquired name information (Step S202).

In a case where the recipient name information of the receipt, which has been extracted by the OCR processing coincides with the acquired name information (Yes in Step S202), the relay server 10 determines that the operator is the recipient, and acquires the application period in a case where the operator is the recipient, from the data storage unit 33 (Step S203).

In a case where the recipient name information of the receipt, which has been extracted by the OCR processing does not coincide with the acquired name information (No in Step S202), the relay server 10 determines that the operator is a person except for the recipient, and acquires the application period in a case where the operator is an agent of the recipient, from the data storage unit 33 (Step S204).

In a case where the application period is acquired, the relay server 10 calculates the application deadline based on the date (reception date) of the receipt and the acquired application period (Step S205). Specifically, the application deadline is calculated by adding the application period to the date of the receipt. For example, in a case where the acquired application period is 3 days and the date of the receipt is April 3, the application deadline date is calculated to be April 6.

The relay server 10 determines whether or not the current date and time after the preservation application of the receipt image has been performed is within the application deadline (Step S206).

In a case where the current date and time is within the application deadline (Yes in Step S206), the relay server 10 transmits a preservation processing request in which a request for adding a time stamp to the receipt image and preserving the receipt image is provided, to the preservation server 30 (Step S207).

In a case where the current date and time has passed the application deadline (No in Step S206), the relay server 10 notifies the operator of the occurrence of an error (Step S208).

Figure 10:
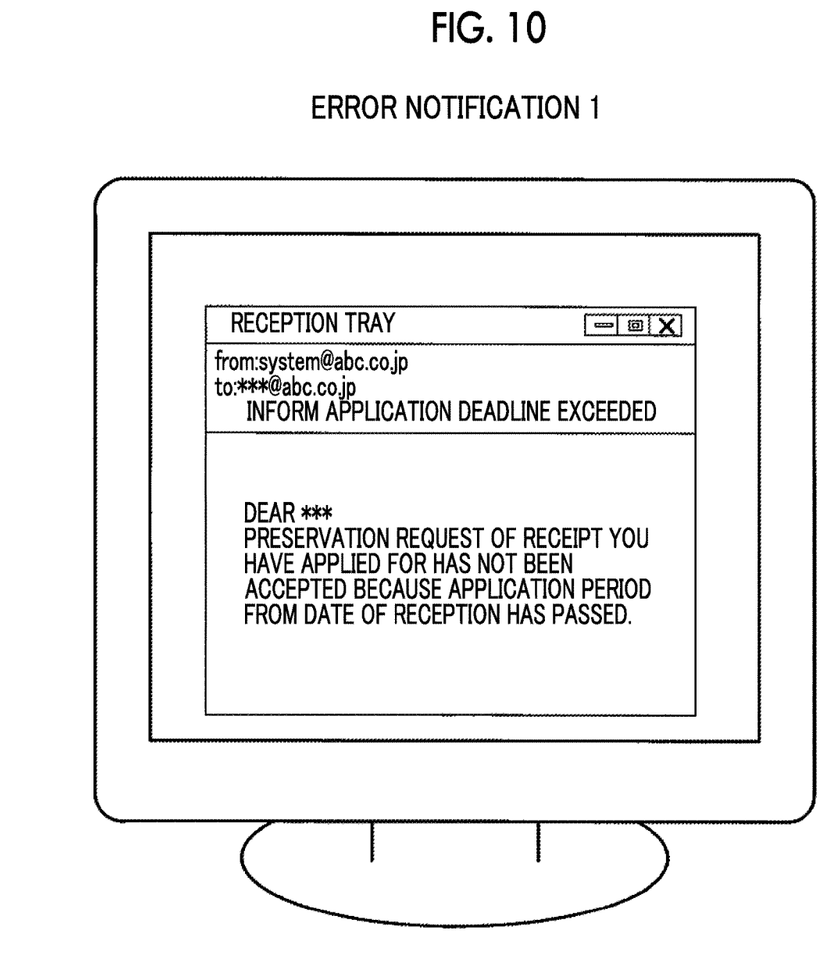
FIG. 10 is a diagram illustrating an example of an error notification performed for an operator, in a case where the current date and time has passed the application deadline.

FIG. 10 illustrates an example of an error notification performed to the operator in this manner. FIG. 10 illustrates an example of a case where an electronic mail having the contents as follows is transmitted to a personal computer of the operator: "the preservation request of receipt you have applied for has not been accepted because the application period from the date of the reception has passed". In a case where the preservation application has been performed after the application deadline, such an error notification is performed, and the receipt image is not transmitted to the preservation server 30. Thus, even in a case where the fee of adding a time stamp in the preservation server 30 is charged, it is possible to prevent an occurrence of a situation in which a time stamp is added to an invalid receipt image and thus useless charging occurs.

In a case where the error notification as illustrated in FIG. 10 is performed, in a case where the operator is the recipient, a notification to urge the agent to make an application may be performed as long as the application deadline does not have elapsed yet.

Figure 11:
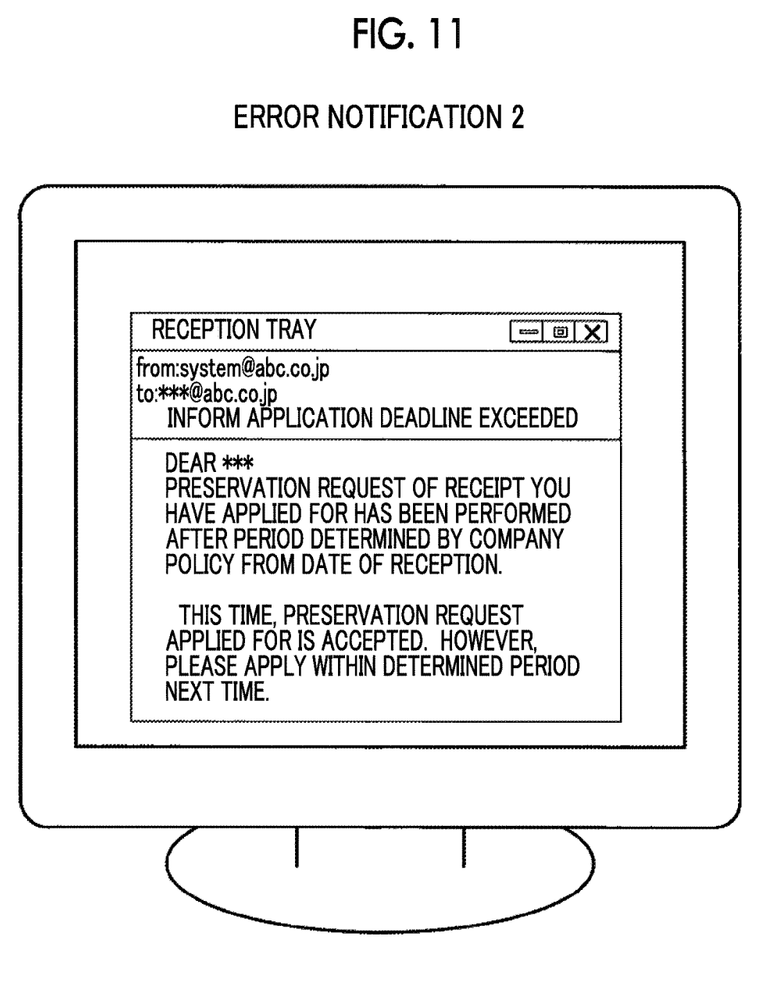
FIG. 11 is a diagram illustrating an example of an error notification transmitted in a case where an application of preserving a receipt image is performed after an application deadline based on a company policy.

FIG. 11 illustrates an example of the error notification transmitted in a case where an application period in, for example, a company policy, which is different from the legal application period is set, and the preservation application of the receipt image is performed before the legal application deadline, but after the application deadline determined by a company policy. FIG. 11 illustrates an example of a case where an electronic mail for a notification of warning contents is transmitted. The warning contents are as follows. The preservation application of the receipt image has performed after the application deadline determined by the company policy. This time, the preservation application is accepted, but you will make an application within the determined application deadline next time.

As described above, the check processing of the application deadline is performed. Thus, in a case where the preservation application of the receipt image is performed within the application deadline, the preservation processing request of adding a time stamp to the receipt image and preserving the receipt image is performed from the relay server 10 to the preservation server 30 (Step S106).

Alternatively, in a case where the preservation application of the receipt image is not performed within the application deadline, the relay server 10 transmits a notification of a message indicating that performing the preservation application is not possible, to the operator in a manner of an electronic mail or the like (Step S106).

In a case where the preservation processing request to the preservation server 30 is performed, the preservation server 30 performs processing of adding a time stamp to the receipt image is performed (Step S107), and then preserves the receipt image having a time stamp added thereto (Step S108).

In the exemplary embodiment, the descriptions are made by using a case where the recipient of a receipt is specified based on the receipt image. However, instead of specifying the recipient based on the receipt image, the operator may select the recipient or a person except for the recipient by an operation of the user in a case where the receipt is converted into the receipt image by digitization in the image forming apparatus 20.

Figure 12:
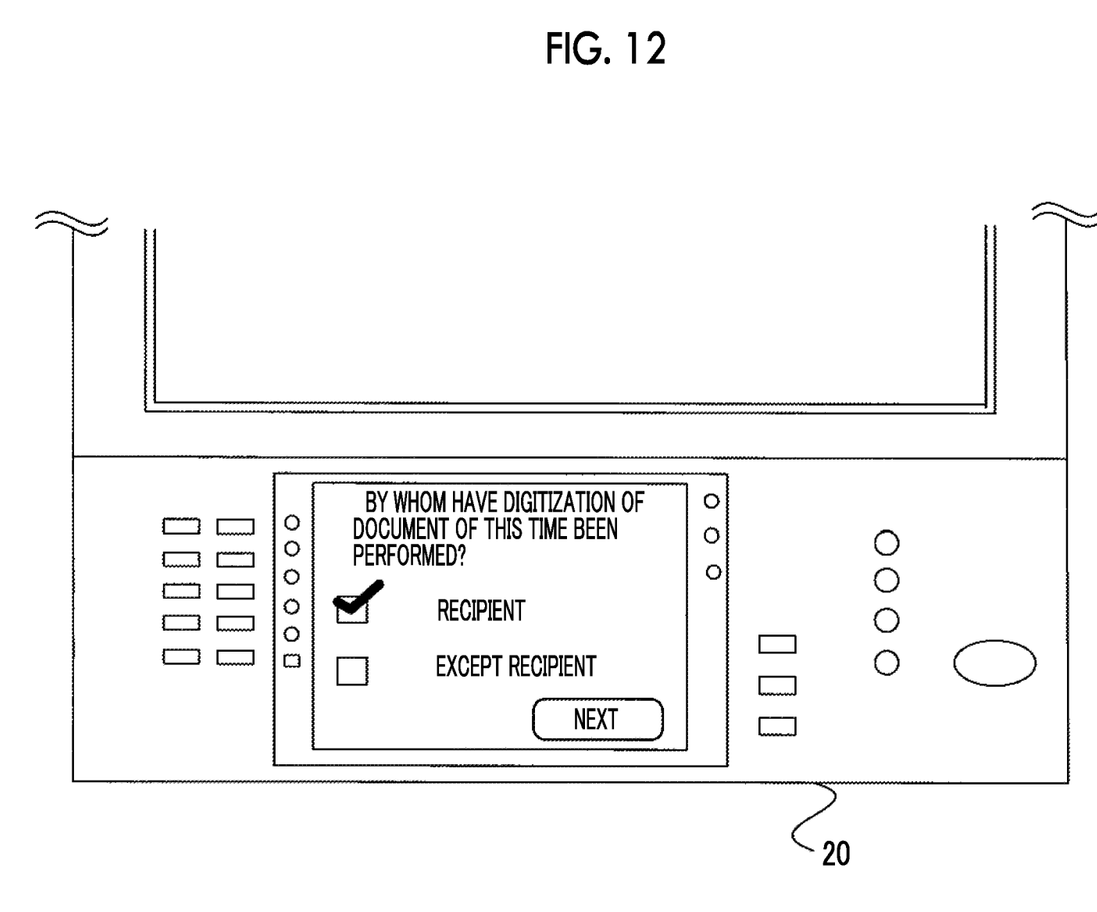
FIG. 12 is a diagram illustrating an example of a display image of an operation panel of an image forming apparatus 20 in a case where a user selects a recipient or a person except for the recipient, as an operator.

For example, in a case where scanning is performed to obtain an image of the receipt in the image forming apparatus 20, a display as illustrated in FIG. 12 is displayed on an operation panel. The user selects the recipient or a person except for the recipient, that is, an agent of the recipient, as the operator who has digitized the receipt.

In a case where the preservation application of the receipt image is performed from the image forming apparatus 20 to the relay server 10, information which is input by the user and indicates whether the operator is the recipient or a person except for the recipient is digitized, and the information is transmitted along with the digitized receipt image.

The relay server 10 specifies whether the operator is the recipient or a person except for the recipient, based on the information which has been transmitted from the image forming apparatus 20 and indicates whether the operator is the recipient or a person except for the recipient.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an image forming apparatus section that acquires an image of a digitized document;
   an optical character reading server that acquires date information from the image acquired by the image forming apparatus; and
   a controller that acquires a first application period in a case where a recipient receiving the document is different from an operator who has performed an operation of digitizing the document, wherein the first application period is different from a second application period acquired in a case where the recipient is the same as the operator;
   wherein the controller performs processing of preserving the image in a case where a current date and time satisfies a preset criterion for an application deadline set based on the date information acquired by the optical character reading server and the first application period or the second application period acquired by the controller.

2. The information processing apparatus according to claim 1,
   wherein the information processing apparatus further comprises a relay server that acquires information indicating whether the operator is the recipient or a person except for the recipient, along with the image of the digitized document, and
   the controller acquires the first application period different from the second application period acquired in a case where the recipient is the same as the operator, in a case where the relay server acquires information indicating that the operator is the person except for the recipient.

3. The information processing apparatus according to claim 1,
   wherein, in a case where the recipient is different from the operator, the controller acquires the first application period longer than the second application period acquired in a case where the recipient is the same as the operator.

4. The information processing apparatus according to claim 1,
   wherein the controller performs the processing of preserving the image, in a case where the application deadline set based on the date information acquired by the optical character reading server and the first application period or the second application period acquired by the controller is later than the current date and time.

5. The information processing apparatus according to claim 1,
   wherein the controller performs processing of adding a time stamp to the image and preserving the image having the time stamp, in a case where the current date and time satisfies the preset criterion for the application deadline set based on the date information acquired by the optical character reading server and the first application period or the second application period acquired by the controller.

6. The information processing apparatus according to claim 1, further comprising:
   a data storage device that stores the second application period in a case where the recipient is the same as the operator and the first application period in a case where the recipient is different from the operator;
   wherein the controller calculates the application deadline from the date information acquired by the optical character reading server and the first application period or the second application period acquired by the controller,
   wherein the controller acquires the second application period from the data storage device in a case where the recipient is the same as the operator, and acquires the first application period from the data storage device in a case where the recipient is different from the operator, and
   the controller performs the processing of preserving the image, in a case where the current date and time satisfies the preset criterion for the application deadline calculated by the controller.

7. The information processing apparatus according to claim 6,
   wherein the data storage device stores a third application period different from the first application period and the second application period, and
   in a case where the current date and time does not have passed the application deadline based on the first application period, and but has passed the application deadline based on the third application period, the operator is notified of a message indicating the case.

8. The information processing apparatus according to claim 1,:
   wherein the controller notifies the operator of a message indicating that performing the processing of preserving the image is not possible, in a case where the current date and time does not satisfy the preset criterion for the application deadline set based on the date information acquired by the optical character reading server and the first application period or the second application period acquired the controller.

9. The information processing apparatus according to claim 8,
   wherein the the optical character reading server acquires issuer information from the image acquired by the image forming apparatus, and
   in a case where the issuer of the document specified using the issuer information is included in the preset list information, the controller notifies the operator of a message indicating the case.

10. The information processing apparatus according to claim 1,
    wherein the controller specifies the recipient using recipient name information extracted from the image acquired by the image forming apparatus,
    wherein the controller acquires the first application period in a case where the recipient is different from the operator, wherein the first application period is different from the second application period acquired in a case where the recipient specified by the controller is the same as the operator.

11. The information processing apparatus according to claim 10,
    wherein, in a case where the recipient is different from the operator, the controller acquires the first application period longer than the second application period acquired in a case where the recipient is the same as the operator.

12. The information processing apparatus according to claim 10,
wherein the controller that performs processing of checking whether or not autograph information is provided in the image acquired by the image forming apparatus, in a case where the recipient receiving the document is the same as the operator who has performed the operation of digitizing the document.

13. The information processing apparatus according to claim 12,
wherein, in a case where the recipient is different from the operator, the controller acquires the first application period longer than the second application period acquired in a case where the recipient is the same as the operator.

14. The information processing apparatus according to claim 1,
wherein the controller specifies the recipient using autograph information extracted from the image acquired by the image forming apparatus,
wherein the controller acquires the first application period in a case where the recipient is different from the operator, wherein the first application period is different from the second application period acquired in a case where the recipient specified by the controller is the same as the operator.

15. The information processing apparatus according to claim 14,
wherein the controller acquires the second application period shorter than the first application period acquired in a case where the recipient receiving the document is different from the operator who has performed the operation of digitizing the document, in a case where the recipient is the same as the operator.

16. The information processing apparatus according to claim 14,
wherein, in a case where the recipient is different from the operator, the controller acquires the first application period longer than the second application period acquired in a case where the recipient is the same as the operator.

17. The information processing apparatus according to claim 14,
wherein the controller specifies a user having autograph information which has been stored in advance and coincides with the extracted autograph information to be the recipient of the document.

18. The information processing apparatus according to claim 17,
wherein the controller acquires the second application period shorter than the first application period acquired in a case where the recipient receiving the document is different from the operator who has performed the operation of digitizing the document, in a case where the recipient is the same as the operator.

19. An information processing system comprising:
an optical character reading server that acquires date information from an image of a digitized document; and
a controller that acquires a first application period in a case where a recipient receiving the document is different from an operator who has performed an operation of digitizing the document, wherein the first application period is different from a second application period acquired in a case where the recipient is the same as the operator;
wherein the controller performs processing of preserving the image in a case where a current date and time satisfies a preset criterion for an application deadline set based on the date information acquired by the optical character reading server and the first application period or the second application period acquired by the controller.

20. A non-transitory computer readable medium storing a program causing a computer to execute:
acquiring an image of a digitized document;
acquiring date information from the acquired image;
acquiring a first application period in a case where a recipient receiving the document is different from an operator who has performed an operation of digitizing the document, wherein the first application period is different from a second application period acquired in a case where the recipient is the same as the operator; and
performing processing of preserving the image in a case where a current date and time satisfies a preset criterion for an application deadline set based on the acquired date information and the acquired first application period or the acquired second application period.

* * * * *